United States Patent
Wals

(10) Patent No.: US 6,399,932 B1
(45) Date of Patent: Jun. 4, 2002

(54) OPTICAL RECORD CARRIER SCANNING DEVICE

(75) Inventor: Jeroen Wals, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/469,877

(22) Filed: Dec. 22, 1999

(30) Foreign Application Priority Data

Dec. 29, 1998 (EP) .............................................. 98204477

(51) Int. Cl.$^7$ ........................ G02B 27/40; G02B 27/64; G02B 7/04
(52) U.S. Cl. ..................................... 250/201.5; 250/234
(58) Field of Search ............................... 250/201.5, 234

(56) References Cited

U.S. PATENT DOCUMENTS

| | | | |
|---|---|---|---|
| 4,724,533 A | | 2/1988 | Ohara et al. .................. 369/45 |
| 4,742,218 A | * | 5/1988 | Nakamura et al. .......... 250/201 |
| 5,513,158 A | * | 4/1996 | Ohsato ...................... 369/44.23 |
| 5,638,352 A | | 6/1997 | Yang ............................ 369/112 |
| 5,708,634 A | * | 1/1998 | Alon et al. ............... 369/44.23 |
| 5,986,996 A | * | 11/1999 | Kitamura et al. ........... 369/116 |

OTHER PUBLICATIONS

"A Tilt Correction in an optical system", by Gerber and Mansuripur, Applied Optics, vol. 35, No. 35, pp. 7000–7007.

* cited by examiner

Primary Examiner—Stephone Allen
Assistant Examiner—Eric Spears

(57) ABSTRACT

An optical scanning device for scanning a record carrier directs a radiation beam towards the record carrier. Two detection systems are arranged in the path of the beam reflected by the record carrier, one before and one after the focus of the beam. Output signals of the detection systems represent the intensity distribution of the beam in the plane of each detection system. The output signals are processed to form a signal representing an aberration of the reflected beam. The aberration may be coma or spherical aberration. The aberration signal is used to control a compensation element in the optical path of the radiation beam incident on the record carrier.

15 Claims, 4 Drawing Sheets

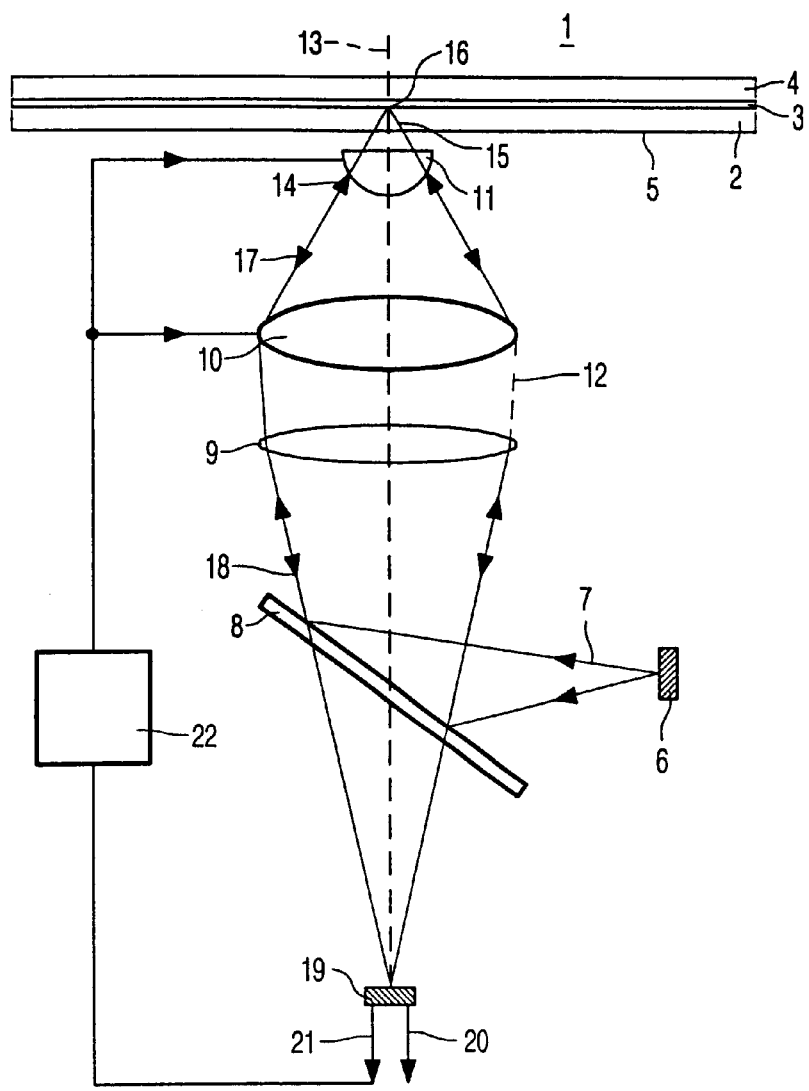
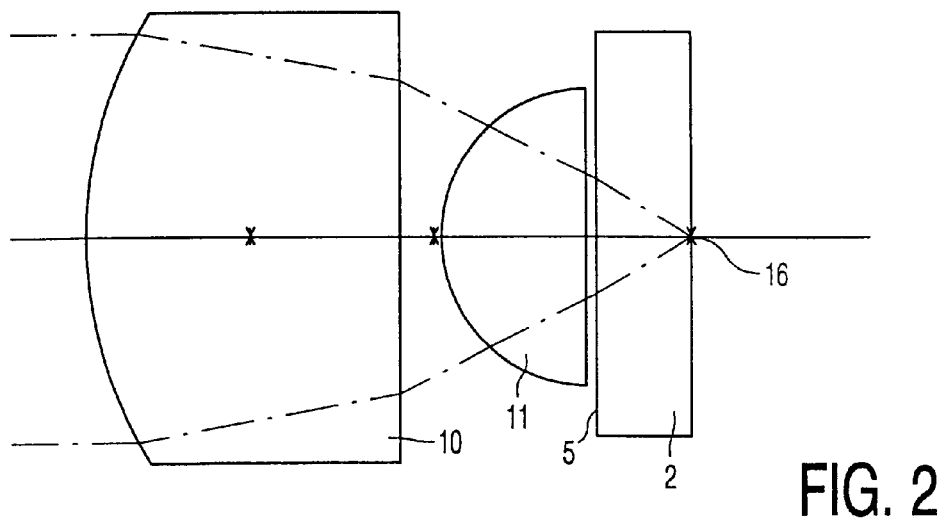
FIG. 1
FIG. 2

OPTICAL RECORD CARRIER SCANNING DEVICE

FIELD OF THE INVENTION

The invention relates to the field of optical information storage and more specifically to optics systems for scanning rotating optical disks.

BACKGROUND OF THE INVENTION

The invention relates to an optical scanning device for scanning an optical record carrier with an information layer, the device having an objective lens for converging a first radiation beam to a spot on the information layer.

An optical scanning device of the this type is known from the article "Tilt correction in an optical system" by Gerber and Mansuripur, Applied Optics, Vol. 35, No. 35, pp. 7000–7007. In the known device a radiation source generates a radiation beam, which is converged to a spot on an information layer by an objective lens. The radiation beam reflected from the record carrier falls on a detection system. The electric output signals of the detection system are used to form a tilt signal, representing the tilt between the normal to the record carrier and the optical axis of the objective system. The tilt causes a comatic aberration of the spot. The tilt signal is used to control a tilt corrector arranged in the path of the first beam to compensate the comatic aberration. It is a disadvantage of the known scanning device that the quality of the spot is not sufficient when scanning high-density optical record carriers.

Those skilled in the art are also directed to U.S. Pat. No. 4,224,533.

The above references are hereby incorporated herein in whole by reference.

SUMMARY OF THE INVENTION

It is an object of the invention to provide a scanning device with a high-quality spot that is sufficient for scanning high-density optical disc carriers such as DVD disks.

The object is achieved in accordance with the invention by a scanning device as described in the opening paragraph, that includes a first and a second detection system for receiving a second radiation beam from the record carrier and arranged before and after an image of the spot, respectively, the detection systems being adapted for determining an intensity profile of incident radiation. The scanning device also includes an electronic circuit connected to electric outputs of the first and second detector for forming an electric signal representing a wavefront aberration of the second radiation beam.

The invention is based on the insight that the optical aberrations in the second beam may be determined from a measurement of the intensity profile of the radiation beam at a position before the image of the spot and at a position after the image of the spot. The value of an optical aberration can be determined from a combination of intensity values of both detection systems. If the second beam is split into two branches and the first and second detection system are arranged in the first and second branch, respectively, both detection systems should receive radiation from the same cross-section of the second beam to ensure proper determination of the wavefront aberration. The measured values of the aberrations allow control of optical elements in the path of the radiation beam that compensate for the effect of the aberrations, thereby improving the quality of the spot formed by the beam on the record carrier. The optical aberrations are the primary aberrations, such as spherical aberration, coma and astigmatism, and higher-order aberrations. It should be noted that optical aberrations do not include defocus.

A special embodiment of the detection system includes a central detector, preferably arranged on the optical axis of the second beam, and an annular detector arranged around the central detector. Such a detection system is very suitable for the detection of spherical aberration in the second beam and also allows determination of the focus error.

Another embodiment of the detection system includes three strip detectors. The detection system allows the determination of both the focus error and spherical aberration. It is also relatively insensitive to changes in the wavelength of the radiation. Such changes affect the path of the radiation beams, in particular where gratings or holograms are used.

It is noted that an optical scanning device having two detection systems, one before and one after an image of the spot, is known from U.S. Pat. No. 4,724,533. The electric detection signals of the first and second detection systems are used for forming a focus error signal, representing the axial distance between the focus of the first radiation beam and the position of the information layer. The detection signals are not used for forming signals representing optical aberrations in the second beam.

The objects, advantages and features of the invention will be apparent from the following more particular description of preferred embodiments of the invention, as illustrated in the accompanying drawings, in which

BRIEF DESCRIPTION OF THE DRAWINGS

FIG. 1 shows a scanning device;

FIG. 2 shows an objective lens and a plano-convex lens;

DETAILED DESCRIPTION OF THE PREFERRED EMBODIMENT

Figure 3A:
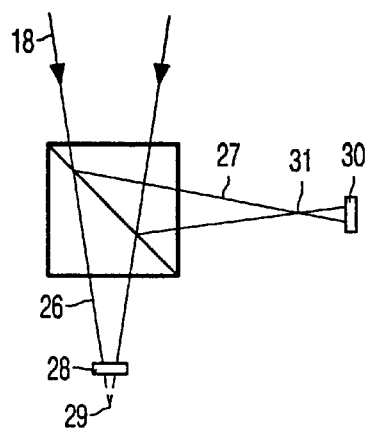
FIG. 3A, B, C show three embodiments of the detection systems and the division of a radiation beam over the detection systems.

FIG. 1 shows a device for scanning an optical record carrier 1. The record carrier having a transparent layer 2, on one side of which an information layer 3 is arranged. The side of the information layer facing away from the transparent layer is protected from environmental influences by a protection layer 4. The side of the. transparent layer facing the device is called the entrance face 5. The transparent layer 2 acts as a substrate for the record carrier by providing mechanical support for the information layer. Alternatively, the transparent layer may have the sole function of protecting the information layer, while the mechanical support is provided by a layer on the other side of the information layer, for instance by the protection layer 4 or by a further information layer and transparent layer connected to the information layer 3. Information may be stored in the information layer 3 of the record carrier in the form of optically detectable marks arranged in substantially parallel, concentric or spiral tracks, not indicated in the Figure. The marks may be in any optically readable form, e.g. in the form of pits, or areas with a reflection coefficient or a direction of magnetization different from their surroundings, or a combination of these forms.

The scanning device includes a radiation source 6, for example a semi-conductor laser, emitting a diverging radiation beam 7. A beam splitter 8, for example a semi-transparent plate, reflects the radiation towards a lens system. The lens system includes a collimator lens 9, an objective lens 10 and a plano-convex lens 11. The collimator lens 9 changes the diverging radiation beam 7 to a collimated beam 12. The objective lens 10, having an optical axis 13, transforms the collimated radiation beam 12 into a converging beam 14 incident on the lens 11. The collimator lens 9 and the objective lens 10 may be combined into a single lens. The piano-convex lens 11 changes the incident beam 14 into a converging beam 15, which comes to a spot 16 on the information layer 3. The plano-convex lens 11 has a convex surface and a flat surface. The flat surface faces the transparent layer 2 and forms a gap between the lens and the layer. Although the objective lens 10 is indicated in the Figure as a single lens element, it may include more elements, and may also include a hologram operating in transmission or reflection, or a grating for coupling radiation out of a waveguide carrying the radiation beam. Radiation of the converging beam 15 reflected by the information layer 3 forms a reflected beam 17, which returns on the optical path of the forward converging beam 14. The objective lens 10 and the collimator lens 9 transform the reflected beam 17 to a converging reflected beam 18, and the beam splitter 8 separates the forward and reflected beams by transmitting at least part of the reflected beam 18 towards detection systems, generally indicated by a single element 19 in the Figure. The detection systems capture the radiation and convert it into electrical signals. One of these signals is an information signal 20, the value of which represents the information read from the information layer 3. Another signal is a focus error signal 21, the value of which represents the axial difference in height between the spot 16 and the information layer 3. The focus error signal is used as input for a focus servo controller 22, which controls the axial position of the objective lens 10 and/or the plano-convex lens 11, thereby controlling the axial position of the spot 16 such that it coincides substantially with the plane of the information layer 3. The part of the detection systems, including one or more radiation-sensitive detection elements and an electronic circuit processing the output signal of the detection elements, used for generating the focus error is called the focus error detection system. The focus servo system for positioning the lens system includes the focus error detection system, the focus servo controller and an actuator for moving the lens system.

The actuator of the lens 10 is controlled by the focus error signal 21 to keep the spot 16 on the information layer 3. The spherical aberration which arises when the radiation beam has to be focused through a transparent layer which is thicker than the design thickness of the layer, is compensated for by a change in the distance between the objective lens 10 and the plano-convex lens 11. The distance between the two lenses is controlled by a signal representing a deviation from a nominal value of the spherical aberration as generated by the transparent layer in the radiation beam.

FIG. 2 shows an enlargement of the objective lens 10 and the plano-convex lens 11. The objective lens 10 may be a mono-aspherical plano-convex lens or a bi-aspherical lens. The objective lens 10 is designed in a known way to compensate for the spherical aberration introduced by the plano-convex lens 11 and a transparent layer 2 having a nominal thickness, thereby making the radiation beam near the spot 16 nominally substantially free from spherical aberration.

If the spot 16 is properly positioned on the information layer 3 and no optical aberrations are introduced in the optical path from the radiation source 6 to the detection systems 19, the wavefront of the reflected beam 18 will be spherical and the beam 18 is unaberrated. Since rays of a beam travel in a direction normal to its wavefront, the rays of the unaberrated beam will travel toward the Gaussian focus, which in the case of a properly focused beam 15 is the image of the spot 16, lying on the optical axis. Any deviation of the wavefront from spherical will cause rays to deviate from the paths of an unaberrated rays, and cause them to travel not toward the Gaussian focus, resulting in changes in the spatial intensity distribution of the beam 18 different from the intensity distribution of the unaberrated beam. The changes in the intensity distribution do not only depend on the type of optical aberration present in the beam 18, but also on the distance from the Gaussian focus. In principle, knowledge of both the intensity distribution of the aberrated beam 18 and of the unaberrated beam in a plane perpendicular to the optical axis suffices to determine the optical aberration of the beam. However, knowledge of the intensity distribution of the unaberrated beam is not available in general. It turns out that a measurement of the intensity distribution in a plane before the Gaussian focus and in a plane after the Gaussian focus provides sufficient information to determine the optical aberration of the beam 18. This is due to the fact that the effect of the deviating path of the rays is different in planes at different positions along the optical axis, and that a comparison of intensities in corresponding positions in each plane can give a result that is insensitive to the actual intensity distribution of the unaberrated beam.

The determination of the value of the aberrations will be simplified if the distance of both planes from the Gaussian focus is equal. The distance between the plane of each detection system and the Gaussian focus is preferably larger than the Raleigh length of the beam 18. The Raleigh length $R_1$ is a distance from Gaussian focus corresponding to $(\pi o2)_{31}^{-1}$ wavelengths, i.e. 225 m$\lambda$, defocus in terms of the Zernike polynomial $R_2^0$. If the value of the defocus for a particular plane is equal to $A_{20}$, the distance of the plane from the Gaussian focus is equal to $2(o2)A_{20}\lambda(NA)^{-2}$ according to the Zernike formalism for describing wavefront aberrations. The Raleigh length is then $2\lambda(\pi NA)^{-2}$, where $\lambda$ is the wavelength of the radiation and NA is the numerical aperture of the beam 18.

FIGS. 3A, B and C show embodiments of detection systems 19 and the division of the reflected beam 18 over two detection systems. One detection system is arranged before the Gaussian focus and one detection system after the Gaussian focus in order to determine the wavefront aberrations in the beam 18. The position of the Gaussian focus corresponds to the position of the image of spot 16 if the beam 18 is unaberrated and beam 15 is properly focussed on the information layer 3.

In FIG. 3A a beam splitter 25 in the form of a semi-reflecting layer divides the beam 18 into two sub-beams 26 and 27. A detection system 28 is arranged in the sub-beam 26 before the focus 29 of the beam 26. A detection system 30 is arranged in the sub-beam 27 after the focus 31 of the beam 27. The focus 29 and 31 correspond to the image of the spot 16 on the record carrier as formed by the lenses 9, 10 and 11.

Figure 3B:
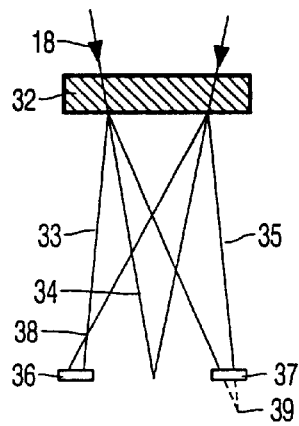

FIG. 3B shows a holographic optical element 32 for splitting the incoming beam 18 as diffracted $-1^{st}$, $0^{th}$ and $+1^{st}$ orders into three sub-beams 33, 34 and 35. Detection systems 36 and 37 are arranged in the paths of the sub-beams 33 and 35, respectively. To range one detection system before and one after the focus of the sub-beam, the detection systems may be arranged at different distances from the holographic element 32. Alternatively, as shown in the Figure, the holographic element 32 may have optical strength for the $-1^{st}$ and $+1^{st}$ order diffracted beams. In that case the detection systems 36 and 37 may be arranged in the same plane, and the sub-beam 33 comes to a focus 38 before the detection system 36 and the sub-beam 35 comes to a focus 39 after the detection system 37. The $0^{th}$ order sub-beam 34 may be used for detecting defocus and tracking error and for generating an information signal.

Figure 3C:
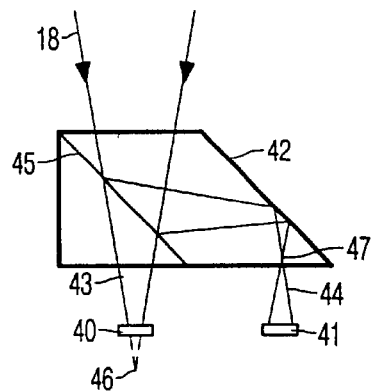

FIG. 3C shows an embodiment in which the detection systems 40 and 41 may be arranged in the same plane. An optical prism element 42 divides the incoming radiation beam 18 into two sub-beams 42 and 43. The difference in path length from the plane of division 45 to the two detection systems 43 and 44 causes the sub-beam 43 to come to a focus 46 after the detection system 40 and the sub-beam 44 to a focus 47 before the detection system 41.

Figure 4:
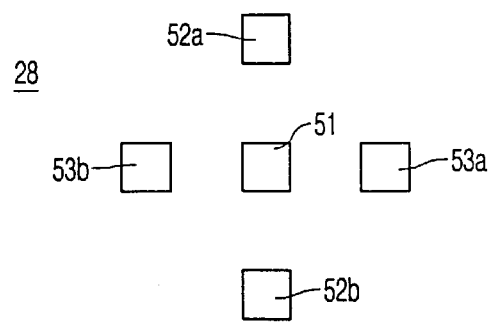
FIG. 4 shows the layout of detectors in an embodiment of the detection system.

FIG. 4 shows a plan view of the detection system 28 shown in FIG. 3A. The detection system 30 has the same layout. The detection system includes five detectors, i.e. a detector 51 arranged on the optical axis of the beam 18, two detectors 52a and 52b arranged on both sides of the optical axis and parallel to the effective track direction and two detectors 53a and 53b arranged on both sides of the optical axis and perpendicular to the effective track direction. The effective track direction is the direction of the image of a track of the record carrier formed on the detection system. The detectors of the detection system 30 are numbered in the same way as the detectors of the detection system 28. If the detection system 30 can be regarded as positioned effectively below the detection system 28 with its light-sensitive surface facing the beam 18 and without rotating the detection system around the normal on its light-sensitive surface; in that position equally numbered detectors are effectively subjacent. Since the beam 18 passes through a focus in between the two detection systems, corresponding detectors on the two detection systems are effectively arranged crosswise. The position of the detectors in the detection systems 28 and 30 are adapted for determining the spherical aberration and coma in the beam 18.

The detection systems 28 and 30 in FIG. 3A having a detector layout as shown in FIG. 4 can be used to determine the amount of spherical aberration present in the beam 18. Thereto the difference signal is formed of the output signals of corresponding detectors in the detection systems 28 and 30, i.e. the difference between the output signal of central detectors 51, the difference signal of the effectively crosswise located detectors 52a in the detection system 28 and 52b in the detection system 30, and that of the effectively crosswise arranged detectors 53b in the detection system 28 and 53a in the detection system 30. The amount of spherical aberration is linearly related to difference signals. In order to reduce the influence of variations in the intensity distribution of the beam 18 over the plane of the detection system, the difference signals are preferably normalized and combined to a spherical aberration signal $S_{A40}$ as follows:

$$S_{A40} = \frac{I_1(51) - I_2(51)}{I_1(51) + I_2(51)} - \frac{I_1(52a) - I_2(52b)}{I_1(52a) + I_2(52b)} - \frac{I_1(52b) - I_2(52a)}{I_1(52b) + I_2(52a)}$$

where $I_1(x)$ and $I_2(x)$ are the signals representing the intensity measured by detector x in the detection system 28 and 30, respectively. Two terms similar to the terms for the detectors 52a and 52b but now for the detectors 53a and 53b may replace the terms for the detectors 52a and 52b or be added to the above expression. It will be clear that the signal $S_{A40}$ not only gives the magnitude of the spherical aberration but also its sign.

The transparent layer 2 of the record carrier 1 causes coma in the beam 15 when the record carrier is tilted with respect to the optical axis 13 of the objective system. When the beam is reflected back through the transparent layer, the coma is cancelled. However, in the regions of the reflected beam where the $+1^{st}$ and $1^{st}$ diffracted orders from the record carrier overlap with the $0^{th}$ order, coma is still visible. The detectors of the two detection systems parallel to or perpendicular to the effective track direction may be used for deriving a signal representing coma due to tilt of the record carrier in a direction parallel or perpendicular to the track direction. Thereto the difference signal is formed of the output signals of corresponding detectors in the detection systems 28 and 30, i.e. the difference between the output signal of the two effectively subjacent detectors 53a and the difference signal of the two effectively subjacent detectors 53b in the detection systems 28 and 30. The amount of coma is related to the first difference signal minus the latter difference signal. In order to reduce the influence of variations in the intensity distribution of the beam 18 over the plane of the detection system, the difference signals are preferably normalized and combined to a coma signal $S_{A31}$ as follows:

$$S_{A31} = \frac{I_1(53a) - I_2(53a)}{I_1(53a) + I_2(53a)} - \frac{I_1(53b) - I_2(53b)}{I_1(53b) + I_2(53b)}$$

The layout of the detection systems 28 and 30 also allows the determination of the defocus, i.e. of the distance between the focus of beam 15 and the information layer 3. A defocus signal $S_{A20}$ may be determined as follows:

$$S_{A20} = \frac{I_1(51) - I_2(51)}{I_1(51) + I_2(51)} + \frac{I_1(52a) - I_2(52b)}{I_1(52a) + I_2(52b)} + \frac{I_1(52b) - I_2(52a)}{I_1(52b) + I_2(52a)}$$

The influence of variations in the intensity distribution of the beam 18 over the plane of the detection system is reduced by normalization of the difference signals. Since the spherical aberration and defocus interfere in the above determination as well as coma and track error, the simplest way to measure the spherical aberration and coma is to make the measurement when the defocus and track error, respectively, are substantially equal to zero. Thereto the defocus and track error should be measured separately by methods such as the known so-called astigmatic focus method and the push-pull method, respectively.

Figure 5:
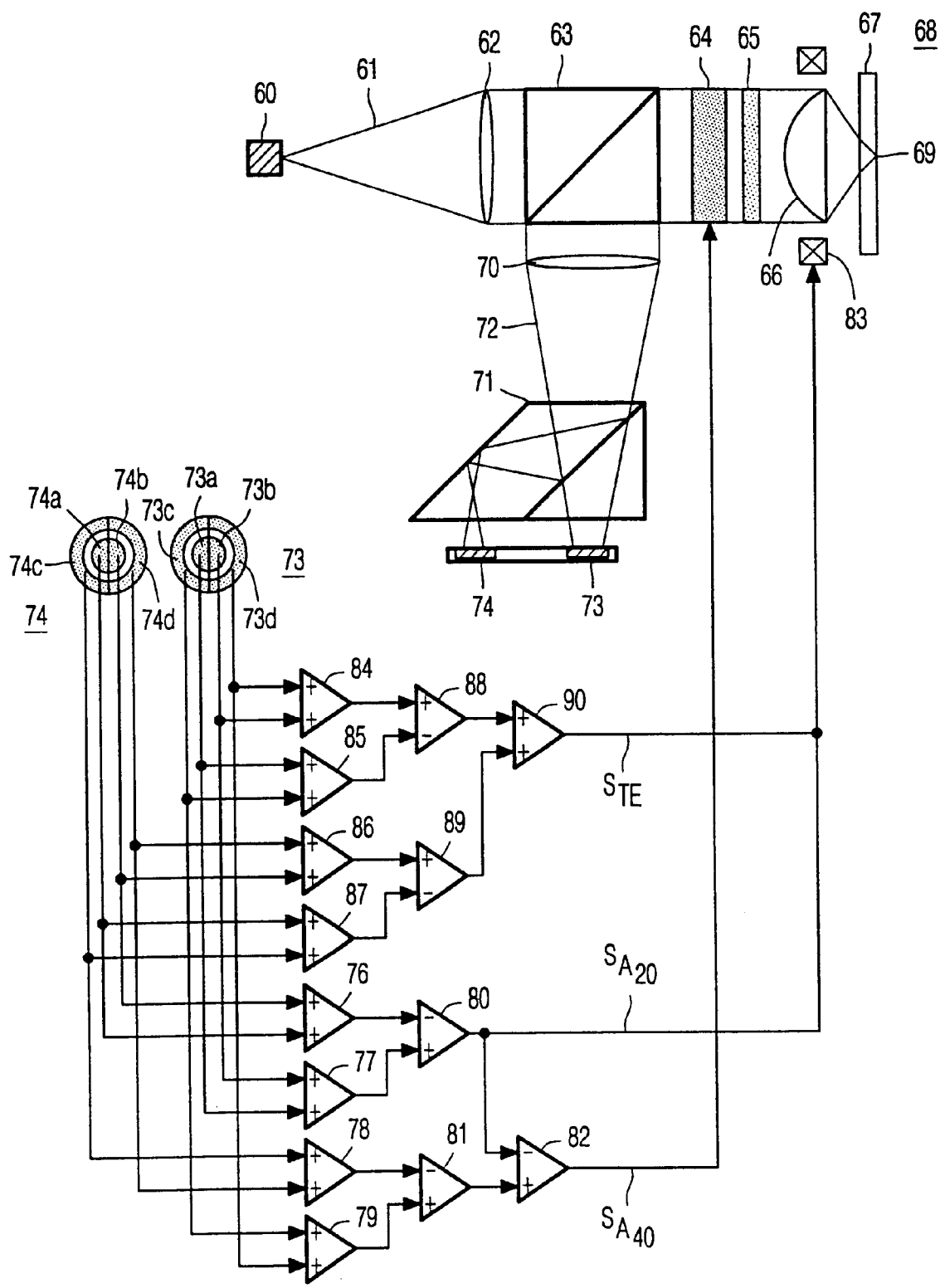
FIG. 5 shows a scanning device according to the invention.

FIG. 5 shows a scanning device with an alternative embodiment of the detection systems. A radiation source 60 emits a radiation beam 61, which is collimated by a collimator lens 62. The beam passes subsequently through a beam splitter 63, an adaptive optical element 64 and a quarter-wave plate 65 before being converged by an objective lens 66 through a transparent layer 67 of a record carrier 68 to a spot 69. The quarter-wave plate converts the linearly polarized incident beam into a circularly polarized beam. The beam 72 reflected from the record carrier is coupled out of the path of the beam 61 by the polarizing beam splitter 63 and converged by a lens 70 to a prism element 71. The prism element divides the beam into two sub-beams, one focused before a detection system 74 and one focused behind a detection system 73. The Figure also shows the detection systems 74 and 73 in plan view. Each detector system includes a split central detector, indicated by elements 73a, 73b and 74a, 74b. A split annular detector is arranged around the central detector, indicated by elements 73c, 73d and 74c, 74d. The detectors are split along the effective track direction. The layout of the detectors is adapted for the determination of the spherical aberration. The layout also allows the determination of the defocus and the tracking error.

The signal $S_{A40}$ representing the spherical aberration may be derived as follows:

$$S_{A40} = \frac{(I_{73c} + I_{73d}) - (I_{74c} + I_{74d})}{(I_{73c} + I_{73d}) + (I_{74c} + I_{74d})} - \frac{(I_{73a} + I_{73b}) - (I_{74a} + I_{74b})}{(I_{73a} + I_{73b}) + (I_{74a} + I_{74b})}$$

where $I_x$ is the signal representing the intensity measured by detector x. FIG. 5 shows an implementation of the derivation of $S_{A40}$, without normalisation, by means of adders 76–79 and subtractors 80–82. The spherical aberration signal is used to control the adaptive optical element 64, which may have the form of a liquid crystal device or a piezo-electric device affecting the phase of the wavefront. The adaptive optical element may also be a deformable mirror.

The signal $A_{20}$ representing the defocus or focus error may be derived as $$S_{A20} = \frac{(I_{73a} + I_{73b}) - (I_{74a} + I_{74b})}{(I_{73a} + I_{73b}) + (I_{74a} + I_{74b})}$$

By using only the central detectors 73a, 73b, 74a and 74b for determining the defocus, a defocus signal is obtained, which is relatively insensitive to the presence of spherical aberration. FIG. 5 shows an implementation of the derivation of $S_{A20}$ without normalisation by means of adders 76 and 77 and subtractor 80. In the embodiment of FIG. 5 the difference of the signals from the annular detectors 73c, 73d, 74c and 74d suffices for the determination of the spherical aberration signal, because the focus servo circuit maintains the difference of the signals from the central detectors at a zero value. The defocus signal is used to control an actuator 83. The actuator can change the axial position of the objective lens 66 and its transverse position. The defocus signal is used to control the axial position.

The signal $S_{TE}$ representing the tracking error, i.e. the deviation between the centre of the spot 16 and the centre line of a track to be scanned in the information layer 3, may be derived according to the push-pull method:

$$S_{TE} = \frac{(I_{73b} + I_{73d}) - (I_{73a} + I_{73c})}{(I_{73b} + I_{73d}) + (I_{73a} + I_{73c})} + \frac{(I_{74b} + I_{74d}) - (I_{74a} + I_{74c})}{(I_{74b} + I_{74d}) + (I_{43a} + I_{74c})}$$

The tracking error signal is used to control the transverse position of the objective lens 66, as schematically indicated in FIG. 5. FIG. 5 shows an implementation of the derivation of $S_{TE}$ without normalisation by means of adders 84–87 and 90 and subtractors 88 and 89. If the scanning device must scan record carriers having a small push-pull signal, the tracking error signal is preferably derived according to the so-called DTD method and each central and annular detector is not divided into two detectors as shown in FIG. 5 but into four quadrant detectors.

The diameter of the central detectors 73a plus 73b and 74a plus 74b is preferably substantially equal to 35% of the diameter of the spot formed by the beam incident on the detection systems if the beam is See from aberrations. The inner and outer diameter of the annular detectors 73c plus 73d and 74c plus 74d is preferably substantially equal to 55% and 80%, respectively, of the spot diameter of the unaberrated incident beam. These dimensions provide an optimum spherical aberration signal.

Figure 6:
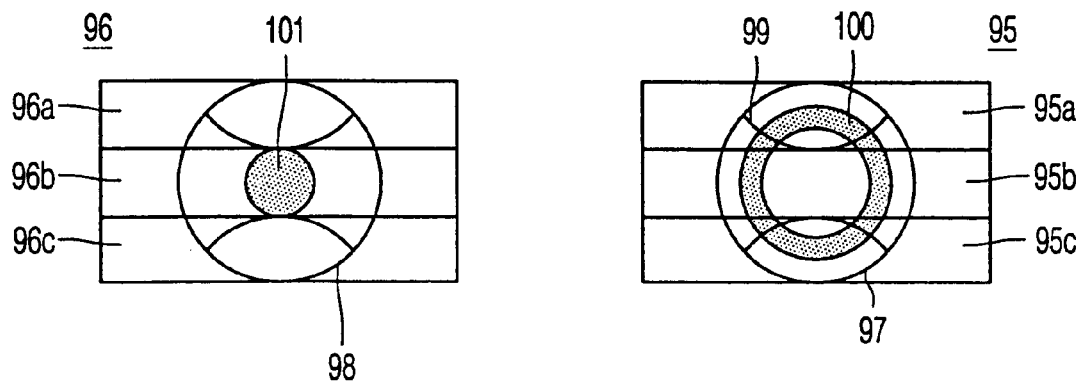
FIG. 6 shows the layout of detectors in an embodiment of the detection system.

FIG. 6 shows two detection systems 95 and 96, which may be used in the embodiments shown in FIG. 3A, 3B and 3C. Each detection system includes three parallel strip detectors, indicated by 95a, 95b, 95c, 96a, 96b and 96c. Circles 97 and 98 indicate the cross-section of the unaberrated beam in the plane of the detection system. The circle segments 99 indicate the area of overlap between the $0^{th}$ order beam and the $-1^{st}$ and $+1^{st}$ order beam diffracted by the track structure of the record carrier. Shaded ring 100 is the area of higher intensity in the intensity distribution on the detection system when the beam suffers from spherical aberration. Circle 101 is the corresponding area of higher intensity on the other detector due to the same spherical aberration. The sizes of these areas relative to the size of the unaberrated beam are relatively independent of the location of the detection system on the optical axis. The layout of the detectors is adapted to the determination of the spherical aberration, defocus and tracking error. When the amount of radiation emitted by a semiconductor laser or the temperature of the laser is changed, the wavelength of the emitted radiation also changes. As a consequence, in a scanning device where the beams incident on the detection systems are formed by a diffractive element, such as a hologram or grating, the position of the spot on the detection systems also changes. Since a displacement of the intensity distribution along the division lines of the detectors shown in FIG. 6 does not affect the output signal of the detectors, the detection systems are very suitable for use in such a scanning device, provided the division lines between the strip detectors is substantially perpendicular to the direction of the grating lines of the diffractive element.

The signal $S_{A40}$ representing the spherical aberration may be derived as follows:

$$S_{A40} = \frac{I_{95b} - I_{96b}}{I_{95b} + I_{96b}} - \frac{I_{95a} + I_{95c} - I_{96a} - I_{96c}}{I_{95a} + I_{95c} + I_{96a} + I_{96c}}$$

where $I_x$ is the signal representing the intensity measured by detector x. The defocus signal $S_{A20}$ may be obtained in the following way:

$$S_{A20} = \frac{(I_{95a} + I_{95c} + I_{96b}) - (I_{96a} + I_{96c} + I_{95b})}{(I_{95a} + I_{95c} + I_{96b}) + (I_{96a} + I_{96c} + I_{95b})}$$

The tracking error $S_{TE}$ can be derived as:

$$S_{TE} = \frac{(I_{95a} + I_{96c}) - (I_{95c} + I_{96a})}{(I_{95a} + I_{96c}) + (I_{95c} + I_{96a})}$$

The combination of detector signals makes the error and aberration signals relatively insensitive to displacement of the radiation beam in a direction perpendicular to the dividing lines between the detectors.

The width of the strip detectors 95b and 96b is preferably equal to 35% of the diameter of the cross-section of the unaberrated beam, i.e. substantially equal to the width of area 101. The width of the neighbouring strip detectors 95a, 95c, 96a and 96c may be from 35% to 100% of the radius of the cross-section. An increase in the spherical aberration signal will be obtained if the width of the neighbouring detectors is from 35% to 80% of the radius of the cross-section. A further increase in the spherical aberration signal may be obtained if the width of the neighbouring detectors is from 55% to 80%, thereby having a width substantially equal to the width of the ring 100.

Figure 7:
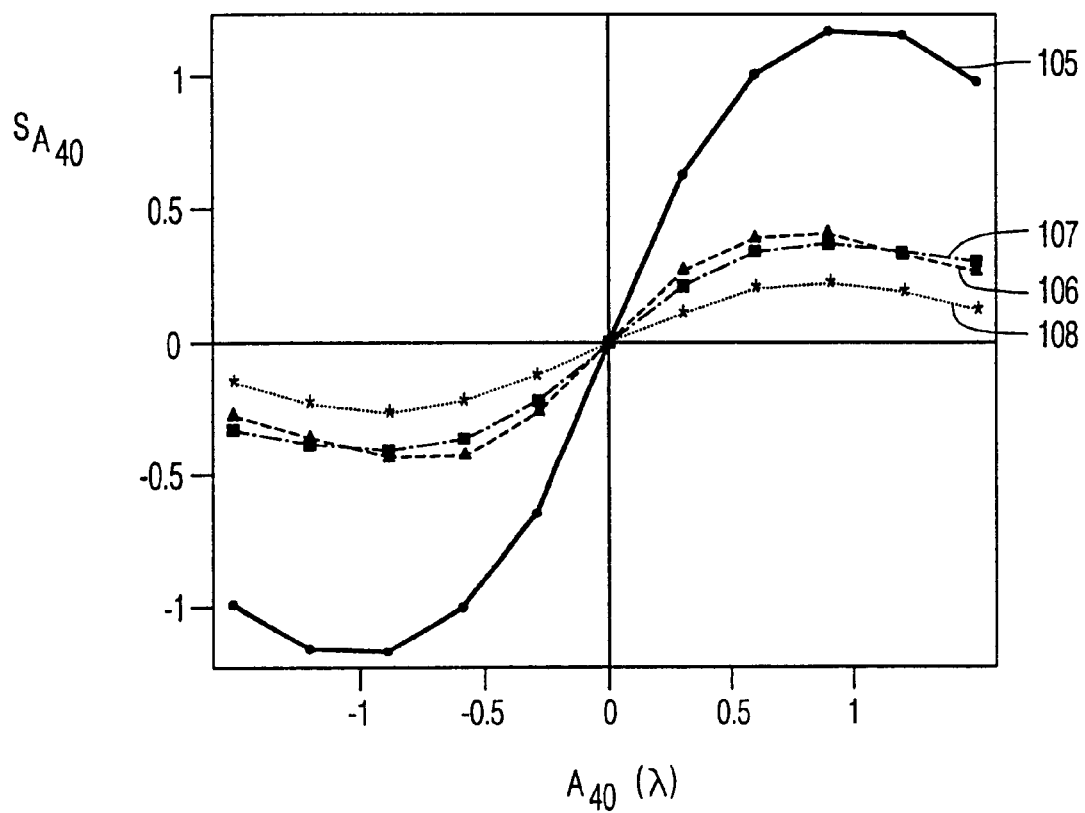
FIG. 7 shows a graphical presentation of normalised spherical aberration signal as a function of the amount of spherical aberration introduced in the radiation beam under investigation.

FIG. 7 shows a graphical presentation of the normalised spherical aberration signal $S_{A40}$ as a function of the amount $A_{40}$ of spherical aberration introduced in the radiation beam incident on the detection systems. The wavelength of the radiation beam is 650 nm, the distance between each detection system and the Gaussian focus is equal to 760 μm, corresponding to 5λ defocus. The numerical aperture of the beam incident on the record carrier is 0.60 and that of the beam incident on the detection systems is equal to 0.11. Curve 105 represents the normalised response of the circular detection system 73 and 74 as shown in FIG. 5. Curve 106 is the response of the detection systems 95 and 96, where the detectors 95a, 95c, 96a and 96c have a width from 55% to 80% of the radius of the cross-section of the unaberrated beam; i.e. the distance between the centre of the detectors 95a, 95c, 96a and 96c and the centre of the central detectors 95b and 96b is substantially equal to 67% of the radius. Curve 107 is similar to curve 106, but the width is from 35% to 80%, whereas the width in the detection system of curve 108 is from 35% to 100%. The Figure shows that the narrowing of the strip detector width increases the normalised response.

Curve 105 of FIG. 7 shows that the response of the circular detection systems at a mutual distance of 10λ defocus reaches a maximum value for a spherical aberration of approximately 1λ. Hence, the detection system can measure spherical aberration up to 1λ. In general, the amount of spherical aberration increases linearly with the distance between the two detection systems. The distance between the two detection systems is preferably equal to 10 A defocus if the measurement range for spherical aberration is from –A to +A; this value is in particular suitable for ring-shaped detection systems as shown in FIG. 5. The distance is more preferably equal to 5 A defocus; this is in particular suitable for detection systems having strip detectors as shown in FIG. 6.

The information signal, representing information stored on the record carrier, may be derived from a sum of the output signals of the separate detectors of both detection systems. In a special embodiment of the scanning device the information signal is a sum of the output signals of the central detectors of both detection systems. A scanning device comprising a third sub-beam divided from the reflected beam may use this third beam for generating the information signal. It will be clear to the skilled person, that the layout of any of the detection systems 28, 30, 36, 37, 40, 41 may be similar to that of detection system 28, 73 or 97.

The invention has been disclosed with reference to specific preferred embodiments, to enable those skilled in the art to make and use the invention, and to describe the best mode contemplated for carrying out the invention. Those skilled in the art may modify or add to these embodiments or provide other embodiments without departing from the spirit of the invention. The scope of the invention is not limited to the embodiments, but lies in each and every novel feature or combination of features described above and in every novel combination of these features. Thus, the scope of the invention is only limited by the following claims.

What is claimed is:

1. An optical scanning device comprising:
   an objective lens for converging a first radiation beam to a spot on an information layer of an information carrier, the first radiation beam producing a second radiation beam traveling away from a record carrier;
   a first and a second detection system positioned for receiving the second radiation beam from the record carrier and arranged before and after an image of the spot, respectively, the detection systems having means for determining an intensity profile of incident radiation; and
   an electronic circuit connected to electric outputs of the first and second detector for forming an electric signal representing a wavefront aberration of the second radiation beam.

2. The device of claim 1, wherein the distance between the first detection system and the image of the spot is substantially equal to the distance between the image of the spot and the second detection system.

3. The device of claim 1, wherein the distance between the first or second detection system and the image of the spot is larger than the Raleigh length of the second radiation beam.

4. The device of claim 1, wherein the first and second detection system each comprise a central detector centered on the optical axis of the second beam and an annular detector arranged around it.

5. The device of claim 4, wherein the central detector and the annular detector are each split into two sub-detectors.

6. The device of claim 1, wherein each detection system comprises a central strip detector and two neighboring strip detectors.

7. The device of claim 6, wherein the central detector is arranged on the optical axis of the second beam.

8. The device of claim 6, wherein the width of the central strip detector is substantially equal to 0.35 times the diameter of a non-aberrated second beam at the axial position of the central detector.

9. The device of claim 6, wherein the distance between the center of the neighboring strip detector and the optical axis is substantially equal to 0.67 times the radius of a non-aberrated second beam at the axial position of the central detector.

10. The device of claim 6, wherein the width of the neighboring strip detector is substantially equal to 0.25 times the radius of a non-aberrated second beam at the axial position of the central detector.

11. The device of claim 1 having a measurement range for spherical aberration from –A to +A, wherein the distance between the first and second detection system is substantially equal to 10 A defocus in Zernike terms of the second radiation beam.

12. The device of claim 1, wherein the first and second detection system each comprise a plurality of detectors and the electronic circuit is arranged for forming a difference signal between detector signals of corresponding detectors of the first and second detection system.

13. The device of claim 12, wherein each of the plurality of detectors has a position within the appropriate detection system corresponding to the wavefront aberration to be determined.

14. The device of claim 12, wherein each detection system comprises a detector arranged on the optical axis of the second radiation beam and a detector arranged at a position removed from the optical axis.

15. The device of claim 1, wherein:
   the distance between the first detection system and the image of the spot is substantially equal to the distance between the image of the spot and the second detection system;

the distance between the first or second detection system and the image of the spot is larger than the Raleigh length of the second radiation beam;

the first and second detection system each comprise a plurality of detectors and the electronic circuits is arranged for forming a difference signal between detector signals of corresponding detectors of the first and second detection system;

each of the plurality of detectors has a position within the appropriate detection system corresponding to the wavefront aberration to be determined;

each detection system comprises a detector arranged on the optical axis of the second radiation beam and a detector arranged at a position removed from the optical axis;

the first or second detection systems are each selected from: a central detector centered on the optical axis of the second beam and an annular detector arranged around it; and a central strip detector and two neighboring strip detectors;

the central detector and the annular detector are each split into two sub-detectors;

the central strip detector is arranged on the optical axis of the second beam;

the width of the central strip detector is substantially equal to 0.35 times the diameter of a non-aberrated second beam at the axial position of the central detector;

the distance between the center of the neighboring strip detector and the optical axis is substantially equal to 0.67 times the radius of a non-aberrated second beam at the axial position of the central detector;

the width of the neighboring strip detector is substantially equal to 0.25 times the radius of a non-aberrated second beam at the axial position of the central detector; and a measurement range for spherical aberration from −A to +A, and the distance between the first and second detection system is substantially equal to 10*A defocus in Zernike terms of the second radiation beam.

* * * * *